(12) United States Patent
Carns et al.

(10) Patent No.: US 7,581,700 B2
(45) Date of Patent: Sep. 1, 2009

(54) ADJUSTABLE FITTINGS FOR ATTACHING SUPPORT MEMBERS TO FLUID CONDUITS, INCLUDING AIRCRAFT FUEL CONDUITS, AND ASSOCIATED SYSTEMS AND METHODS

(75) Inventors: James A. Carns, Wichita, KS (US); Theron L. Cutler, Wichita, KS (US); Mark A. Shelly, Bel Aire, KS (US); Benjamin P. Van Kampen, Wichita, KS (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 11/440,726

(22) Filed: May 24, 2006

(65) Prior Publication Data

US 2006/0278763 A1 Dec. 14, 2006

Related U.S. Application Data

(60) Provisional application No. 60/689,223, filed on Jun. 9, 2005.

(51) Int. Cl.
*B64D 39/06* (2006.01)

(52) U.S. Cl. .................. 244/135 R; 248/62; 248/68.1; 248/74.1; 285/61; 138/103; 244/118.1; 244/129.1

(58) Field of Classification Search ............. 244/129.1, 244/131, 135 R, 135 A, 136, 118.1; 285/61, 285/62, 24, 27; 138/103, 106, 107; 114/261, 114/262, 250; 441/4, 5, 151.1; 248/62, 65, 248/68.1, 74.1, 903, 49; 24/457, 458; 403/3, 403/4, 315–320; 411/398, 539; 280/86.753; 16/368, 369, 370, 108, 109

See application file for complete search history.

(56) References Cited

U.S. PATENT DOCUMENTS 724,675 A 4/1903 Decker (Continued)

FOREIGN PATENT DOCUMENTS

DE 2744674 4/1979

(Continued)

OTHER PUBLICATIONS

U.S. Appl. No. 11/067,331, filed Feb. 25, 2005, Crangle.

(Continued)

*Primary Examiner*—Michael R Mansen
*Assistant Examiner*—Joshua J Michener
(74) *Attorney, Agent, or Firm*—Perkins Coie LLP (57) ABSTRACT

Adjustable fittings for attaching support members to fluid conduits, including aircraft fuel conduits, are disclosed herein. An aircraft system in accordance with one embodiment of the invention includes a fluid conduit carried by an aircraft and a housing fixedly attached to the fluid conduit. The housing can include a first attachment feature having one of a projection extending outwardly from the housing or an aperture extending at least partially through the housing. The system further includes a support member having an attachment portion positioned proximate to the attachment feature. The attachment portion includes a support member aperture positioned over at least a portion of the first attachment feature. An adjustable fitting couples the support member to the housing. The adjustable fitting can include a first side, a second side opposite the first side, and an engagement portion at the second side positioned within at least a portion of the support member aperture. The fitting can also include a second attachment feature mated with the first attachment feature. The second attachment feature includes the other one of the projection or the aperture. The second attachment feature has a center point eccentrically offset from a center point of the fitting.

13 Claims, 6 Drawing Sheets

U.S. PATENT DOCUMENTS

| | | | |
|---|---|---|---|
| 2,091,916 A | 8/1937 | Evans | |
| 2,213,680 A | 9/1940 | Barnett | |
| 2,414,509 A | 1/1947 | Andre | |
| 2,453,553 A | 11/1948 | Tansley | |
| 2,475,635 A | 7/1949 | Parsons | |
| 2,552,991 A | 5/1951 | McWhorter | |
| 2,668,066 A | 2/1954 | Stadelhofer | |
| 2,670,913 A | 3/1954 | Castor et al. | |
| 2,859,002 A | 11/1958 | Leisy | |
| 2,919,937 A | 1/1960 | Dovey | |
| 2,953,332 A | 9/1960 | Cobham et al. | |
| 2,960,295 A | 11/1960 | Schulz | |
| 2,973,171 A | 2/1961 | Ward et al. | |
| 3,747,873 A | 7/1973 | Layer et al. | |
| 3,836,117 A | 9/1974 | Panicall | |
| 3,928,903 A | 12/1975 | Richardson et al. | |
| 4,044,834 A | 8/1977 | Perkins | |
| 4,072,283 A | 2/1978 | Weiland | |
| 4,095,761 A | 6/1978 | Anderson et al. | |
| 4,119,294 A | 10/1978 | Schnorrenberg | |
| 4,129,270 A | 12/1978 | Robinson et al. | |
| 4,149,739 A | 4/1979 | Morris | |
| 4,150,803 A | 4/1979 | Fernandez | |
| 4,231,536 A | 11/1980 | Ishimitsu et al. | |
| 4,327,784 A | 5/1982 | Denniston | |
| 4,408,943 A | 10/1983 | McTamaney et al. | |
| 4,438,793 A | 3/1984 | Brown | |
| 4,471,809 A | 9/1984 | Thomsen et al. | |
| 4,477,040 A | 10/1984 | Karanik | |
| 4,534,384 A | 8/1985 | Graham et al. | |
| 4,540,144 A | 9/1985 | Perrella | |
| 4,586,683 A | 5/1986 | Kerker | |
| 4,654,612 A * | 3/1987 | Smith | 333/248 |
| 4,665,936 A | 5/1987 | Furrer | |
| 4,717,099 A | 1/1988 | Hubbard | |
| 4,793,578 A * | 12/1988 | Howard | 248/62 |
| 4,796,838 A | 1/1989 | Yamamoto | |
| 4,883,102 A | 11/1989 | Gabrielyan et al. | |
| 4,929,000 A | 5/1990 | Annestedt, Sr. | |
| 5,131,438 A | 7/1992 | Loucks | |
| 5,141,178 A | 8/1992 | Alden et al. | |
| 5,255,877 A | 10/1993 | Lindgren et al. | |
| 5,393,015 A | 2/1995 | Piasecki | |
| 5,427,333 A | 6/1995 | Kirkland | |
| 5,449,203 A | 9/1995 | Sharp | |
| 5,449,204 A | 9/1995 | Greene et al. | |
| 5,530,650 A | 6/1996 | Biferno et al. | |
| 5,539,624 A | 7/1996 | Dougherty | |
| 5,573,206 A | 11/1996 | Ward | |
| 5,785,276 A | 7/1998 | Ruzicka | |
| 5,810,292 A | 9/1998 | Garcia, Jr. et al. | |
| 5,904,729 A | 5/1999 | Ruzicka | |
| 5,906,336 A | 5/1999 | Eckstein | |
| 5,921,294 A | 7/1999 | Greenhalgh et al. | |
| 5,996,939 A | 12/1999 | Higgs et al. | |
| 6,000,459 A * | 12/1999 | Jeppesen | 165/45 |
| 6,076,555 A | 6/2000 | Hettinger | |
| 6,119,981 A | 9/2000 | Young et al. | |
| 6,145,788 A | 11/2000 | Mouskis et al. | |
| 6,302,448 B1 | 10/2001 | Van Der Meer et al. | |
| 6,305,336 B1 | 10/2001 | Hara et al. | |
| 6,324,295 B1 | 11/2001 | Valery et al. | |
| 6,326,873 B1 | 12/2001 | Faria | |
| 6,375,123 B1 | 4/2002 | Greenhalgh et al. | |
| 6,428,054 B1 | 8/2002 | Zappa et al. | |
| 6,454,212 B1 | 9/2002 | Bartov | |
| 6,464,173 B1 | 10/2002 | Bandak | |
| 6,467,725 B1 | 10/2002 | Coles et al. | |
| 6,588,465 B1 | 7/2003 | Kirkland et al. | |
| 6,598,830 B1 | 7/2003 | Ambrose et al. | |
| 6,601,800 B2 | 8/2003 | Ollar | |
| 6,604,711 B1 | 8/2003 | Sinha et al. | |
| 6,651,933 B1 | 11/2003 | von Thal et al. | |
| 6,669,145 B1 | 12/2003 | Green | |
| 6,676,379 B2 | 1/2004 | Eccles et al. | |
| 6,752,357 B2 | 6/2004 | Thal et al. | |
| 6,779,758 B2 | 8/2004 | Vu et al. | |
| 6,796,527 B1 | 9/2004 | Munoz et al. | |
| 6,819,982 B2 | 11/2004 | Doane | |
| 6,824,105 B2 | 11/2004 | Edwards et al. | |
| 6,832,743 B2 | 12/2004 | Schneider et al. | |
| 6,838,720 B2 | 1/2005 | Krieger et al. | |
| 6,902,138 B2 * | 6/2005 | Vantouroux | 248/68.1 |
| 6,994,300 B2 * | 2/2006 | Labeirie et al. | 248/70 |
| 2003/0038214 A1 | 2/2003 | Bartov | |
| 2003/0097658 A1 | 5/2003 | Richards | |
| 2003/0136874 A1 | 7/2003 | Gjerdrum | |
| 2003/0218097 A1 | 11/2003 | Vu et al. | |
| 2004/0069904 A1 | 4/2004 | Thal et al. | |
| 2004/0129865 A1 | 7/2004 | Doane | |
| 2005/0055143 A1 | 3/2005 | Doane | |
| 2006/0000949 A1 | 1/2006 | Schroeder | |
| 2006/0011782 A1 | 1/2006 | Schroeder | |
| 2006/0038076 A1 | 2/2006 | Schroeder | |
| 2006/0071475 A1 | 4/2006 | James et al. | |

FOREIGN PATENT DOCUMENTS

| | | |
|---|---|---|
| DE | 3936198 A1 * | 5/1990 |
| DE | 29901583 | 5/1999 |
| DE | 10013751 | 10/2001 |
| EP | 0807577 | 11/1997 |
| EP | 1094001 | 4/2001 |
| EP | 1361156 | 11/2003 |
| EP | 1695911 | 8/2006 |
| GB | 555984 | 9/1943 |
| GB | 2257458 | 1/1993 |
| GB | 2373488 | 9/2002 |
| IL | 128459 | 5/2003 |
| RU | 2111154 | 5/1998 |
| RU | 2140381 | 10/1999 |
| RU | 2142897 | 12/1999 |
| SU | 673798 | 7/1979 |
| SU | 953345 | 8/1982 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02/076826 | 10/2002 |
| WO | WO-03/102509 | 12/2003 |

OTHER PUBLICATIONS

U.S. Appl. No. 11/078,210, filed Mar. 11, 2005, Smith.
U.S. Appl. No. 11/157,245, filed Jun. 20, 2005, Takacs et al.
U.S. Appl. No. 11/217,696, filed Sep. 1, 2005, Schuster et al.
U.S. Appl. No. 11/258,819, filed Oct. 26, 2005, Cutler et al.
Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German, (5 pgs).
Thales Avionics Ltd., "Air Tanker Bids for Future Strategic Tanker Aircraft," Jul. 3, 2001; www.thalesavionics.net/press/pr43.html; (3 pgs).
Wikipedia, the free encyclopedia, "Electroactive Polymers," http://en.wikipedia.org/wiki/Electroactive_polymers, last update Feb. 27, 2005 (2 pages).
Keller, George R., "Hydraulic System Analysis", pp. 40-41, 1985, Hydraulics & Pneumatics, Cleveland, Ohio.
European Search Report for Application No. EP 06252990; The Boeing Company; Oct. 20, 2006; 9 pgs; European Patent Office.

* cited by examiner

ADJUSTABLE FITTINGS FOR ATTACHING SUPPORT MEMBERS TO FLUID CONDUITS, INCLUDING AIRCRAFT FUEL CONDUITS, AND ASSOCIATED SYSTEMS AND METHODS

CROSS-REFERENCE TO RELATED APPLICATION

The present application claims priority to U.S. Provisional Application No. 60/689,223, filed Jun. 9, 2005, and incorporated herein in its entirety by reference.

TECHNICAL FIELD

The present invention is directed generally toward adjustable fittings for attaching support members to fluid conduits, including aircraft fuel conduits, and associated systems and methods.

BACKGROUND

Modern aircraft include complex fuel systems that route aviation fuel from fuel tanks to aircraft systems that use the fuel. These aircraft systems can include the primary engines and/or auxiliary power units (APUs). In the case of an aerial refueling tanker and/or receiver aircraft, these systems can also include the fluid conduits (e.g., fuel lines), manifolds, and associated valving necessary for delivering fuel to a receiver aircraft and/or receiving fuel in-flight from a tanker aircraft. In some cases, the fuel lines may pass through "ignition zones," which are typically pressurized compartments in the aircraft (e.g., baggage compartments) that may also house electrical devices.

One concern with this arrangement is that the fuel passing through the fluid conduits imparts substantial loads (e.g., surge loads and pressure loads) on the fluid conduits. Accordingly, in many cases support members are attached to various portions of the fluid conduits to distribute and/or transfer the imposed loads to appropriate reaction locations of the aircraft. The support members are generally attached to corresponding fluid conduits with one or more fittings. Many conventional fittings, however, cannot withstand the imposed loads.

Another concern with the above-described arrangement is that the support members generally include suitable tolerances to compensate for the manufacturing tolerances between the various components. Most conventional fittings, however, are not configured to compensate for the various manufacturing tolerances between the different components and, accordingly, a number of different support members and/or fittings have to be manufactured for particular installations. Accordingly, there is a need for fittings configured to withstand the imposed loads while keeping the attached support members in place with respect to the fluid conduits.

SUMMARY

The invention is directed generally to adjustable fittings for attaching support members to fluid conduits, including aircraft fuel conduits, and associated methods. An aircraft system in accordance with one embodiment of the invention includes a fluid conduit carried by an aircraft and a housing fixedly attached to the fluid conduit. The housing can include a first attachment feature having one of a projection extending outwardly from the housing or an aperture extending at least partially through the housing. The system further includes a support member having an attachment portion positioned proximate to the attachment feature. The attachment portion includes a support member aperture positioned over at least a portion of the first attachment feature. An adjustable fitting couples the support member to the housing. The adjustable fitting can include a first side, a second side opposite the first side, and an engagement portion at the second side positioned within at least a portion of the support member aperture. The fitting can also include a second attachment feature mated with the first attachment feature. The second attachment feature includes the other one of the projection or the aperture. The second attachment feature has a center point eccentrically offset from a center point of the fitting. After initial installation, the adjustable fitting is rotatable with respect to the first attachment feature to secure the fitting in place against the support member and the housing.

Another aspect of the invention is directed to an assembly including a first member coupled to a second member with an adjustable fitting. The first member can have a first attachment feature including one of a projection extending outwardly from the first member or an aperture extending at least partially through the first member. The second member, which is positioned proximate to the first member, can include a second member aperture positioned over at least a portion of the first attachment feature. The adjustable fitting coupling the first member to the second member can include a first side facing away from the first member and a second side facing toward the first member. The second side can include an engagement portion positioned within at least a portion of the second member aperture. The fitting can further include a second attachment mated with the first attachment feature. The second attachment feature has the other one of the projection or the aperture. The second attachment feature has a center point eccentrically offset from a center point of the adjustable fitting. After initially installing the fitting, the fitting can be rotated in a generally clockwise and/or counterclockwise direction to releasably secure the fitting against at least a portion of the first attachment feature.

Still another aspect of the invention is directed to a method for installing a support member with a fluid conduit. The method can include positioning a support member proximate to a fluid conduit. The support member includes a support member aperture positioned over at least a portion of a first attachment feature carried by the fluid conduit. The method can also include inserting at least a portion of an adjustable fitting having a second attachment feature through the support member aperture and mating the first and second attachment features. The second attachment feature is eccentrically offset from a center point of the adjustable fitting. The method can further include rotating the fitting with respect to the first attachment feature until the second attachment feature fixedly engages at least a portion of the first attachment feature to secure the support member in place with respect to the fluid conduit.

DETAILED DESCRIPTION

The present disclosure describes adjustable fittings for securing support members to fluid conduits, such as aircraft fuel lines and other systems, and also discloses associated methods. Certain specific details are set forth in the following description and in FIG. 1-4B to provide a thorough understanding of various embodiments of the invention. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
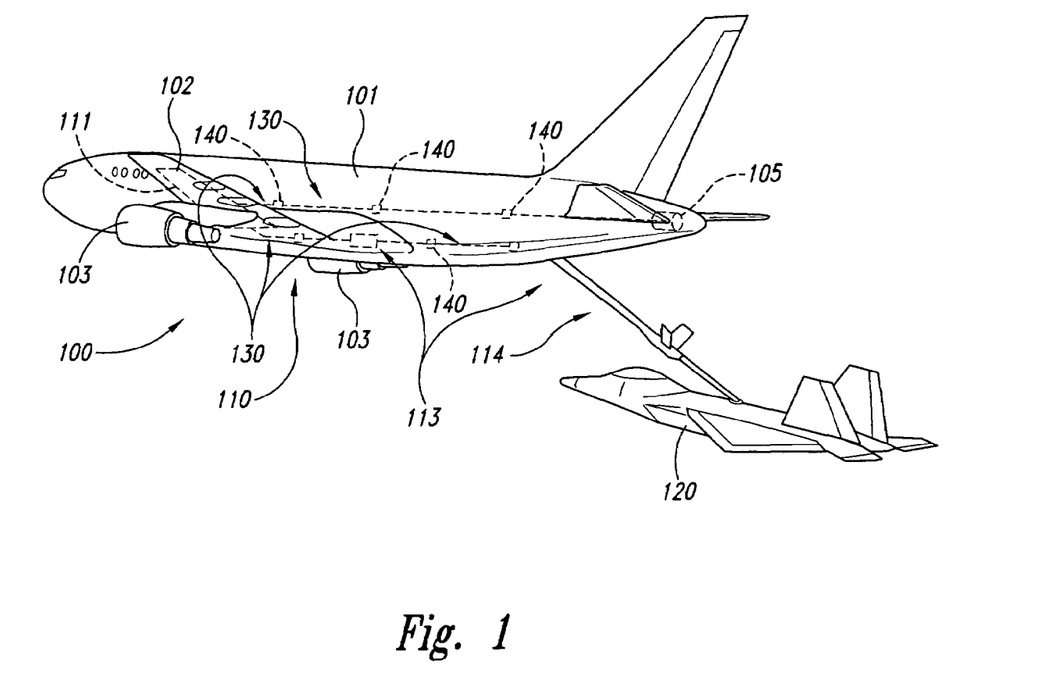
FIG. 1 is a partially schematic, isometric illustration of a refueling aircraft positioned to refuel a receiver aircraft and having fluid conduits attached to one or more support members with adjustable fittings configured in accordance with an embodiment of the invention.

FIG. 1 illustrates an aircraft 100 (e.g., a refueling aircraft) in the process of refueling a receiver aircraft 120 with an aerial refueling device 114. The aircraft 100 can include a fuselage 101, wings 102, and one or more engines 103 (two are shown in FIG. 1 as being carried by the wings 102). In other embodiments, the aircraft can have other configurations and, in at least some embodiments, need not include a refueling capability. In a particular aspect of the embodiment shown in FIG. 1, the aircraft 100 includes a fuel system 110 having wing-mounted fuel tanks 111 and fluid conduits 130 (e.g., fuel lines) that provide fuel to other aircraft systems. These systems can include the engines 103, an APU 105, and an aerial refueling system 113. The fluid conduits 130 can also include one or more support members 140 (shown schematically) coupled to the fluid conduits 130 with one or more adjustable fittings (not shown). The support members 140 are positioned to distribute and/or transfer the imposed loads (e.g., surge loads and pressure loads from fluid movement) on the fluid conduits 130 to appropriate reaction locations of the aircraft 100. Aspects of the invention are directed to the adjustable fittings that couple the support members 140 to the fluid conduits 130, as described in greater detail below with reference to FIG. 2A-4B.

Figure 2A:
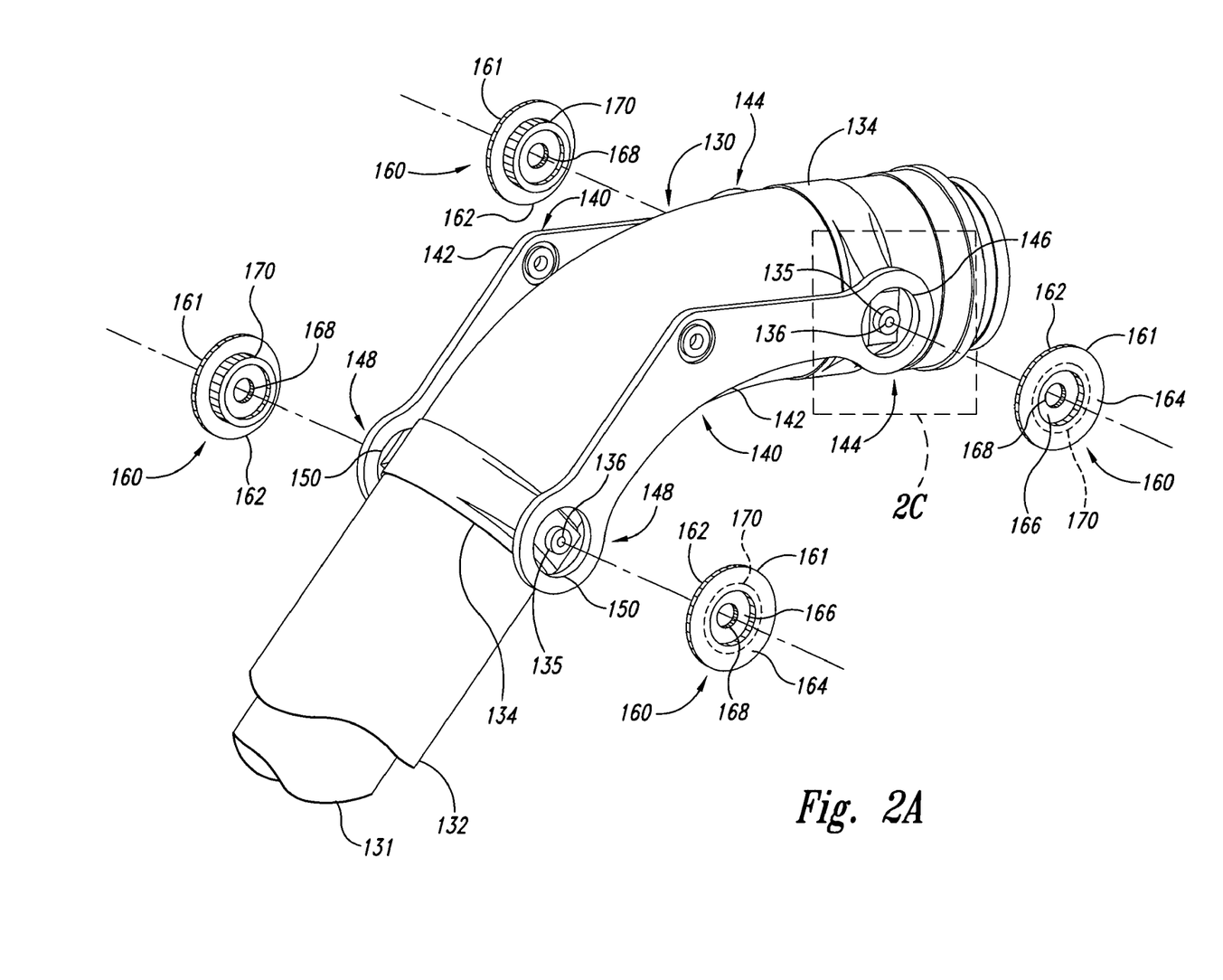
FIGS. 2A-2D are illustrations of various stages of a method for using adjustable fittings to couple support members to fluid conduits in accordance with an embodiment of the invention.

FIG. 2A-2D are illustrations of various stages of a method for using adjustable fittings to couple support members to a fluid conduit in accordance with an embodiment of the invention. FIG. 2A, for example, is an isometric illustration of a preliminary stage of the method illustrating two support members 140 positioned for attachment to a portion of the fluid conduit 130 with adjustable fittings 160. The fluid conduit 130 in the illustrated embodiment can include a first or inner conduit 131 surrounded by a second or outer conduit 132. The inner conduit 131 can be configured to carry fuel or other types of liquids. The outer conduit 132 can provide a protective shroud around the inner conduit 131 in case of a liquid and/or vapor leak in the inner conduit 131. Accordingly, the inner conduit 131 and outer conduit 132 are normally isolated from fluid communication with each other. Suitable shrouded fuel conduits are disclosed in U.S. Pat. No. 6,848,720, which is incorporated herein by reference. In other embodiments, however, the fluid conduit 130 may have other configurations.

The fluid conduit 130 can also include one or more housings 134 attached to the fluid conduit 130. In the illustrated embodiment, for example, the housings 134 are load-carrying supports fixedly attached to the fluid conduit 130 at desired locations. In other embodiments, however, the housings 134 can have other configurations and/or functions. The housings 134 also include one or more first attachment features 135 positioned for engagement with the adjustable fittings 160 for coupling the support members 140 to the fluid conduit 130. In the embodiment shown in FIG. 2A, the first attachment features 135 are generally cylindrical projections extending outwardly away from the housings 134. In other embodiments, however, the first attachment features 135 may have other configurations. The first attachment features 135 can also include threaded apertures 136 for receiving a fastener (e.g., a bolt) to secure the adjustable fittings 160 in place after engagement, as described in detail below with respect to FIG. 2D.

The support members 140 each include a base portion 142, a first attachment portion 144 having a first aperture 146, and a second attachment portion 148 having a second aperture 150. In one aspect of this embodiment, the first and second apertures 146 and 150 have approximately the same diameter. In other embodiments, however, the first and second apertures 146 and 150 can be different sizes. The first and second apertures 146 and 150 are positioned proximate to corresponding first attachment features 135 on the housings 134. In the illustrated embodiment, for example, the first and second apertures 146 and 150 are positioned at least approximately around the periphery of the corresponding first attachment features 135. In other embodiments, the support members 140 may be positioned differently with respect to the first attachment features 135.

Figure 2B:
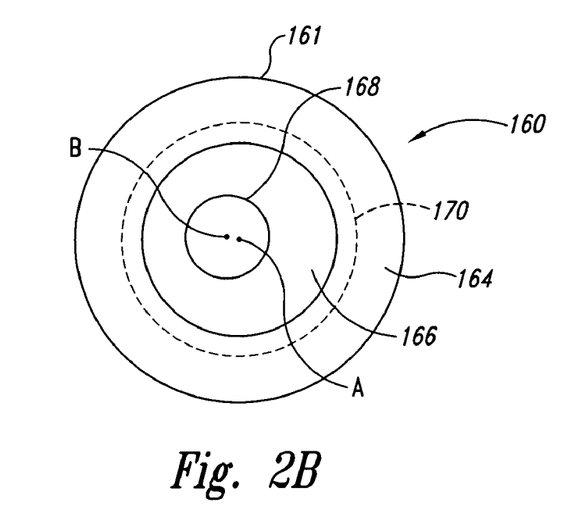

FIG. 2B is a plan view of one of the adjustable fittings 160. Referring to FIGS. 2A and 2B together, each adjustable fitting 160 includes a first side 161 and a second side 162 opposite the first side 161. The first side 161 of each fitting 160 can include a first annular portion 164, a second annular portion 166 having a diameter less then the diameter of the first annular portion 164, and a fitting aperture 168 extending completely through the fitting 160. The outer diameter of the first annular portion 164 is dimensioned to correspond at least in part to the diameter of the first and second attachment portions 144 and 148 of the support members 140. The second side 162 of each fitting 160 can include an engagement portion 170 positioned for engagement with the support members 140. More specifically, the engagement portions 170 are sized to be received within at least a portion of the corresponding apertures 146 and 150 of the support members 140.

The fitting apertures 168 are second attachment features configured to mate with or otherwise engage corresponding first attachment features 135. In the illustrated embodiment, for example, the individual fitting apertures 168 (i.e., second attachment features) are sized to receive at least a portion of each first attachment feature 135 when the fittings 160 are engaged with the support members 140. As best seen in FIG. 2B, the fitting aperture 168 of each adjustable fitting 160 has a center point B eccentrically offset from a center point A of the fitting 160 itself (as defined by the outer diameter of the first annular portion 164). The dimension of the offset in each fitting 160 can vary based on the particular operational requirements for the fitting. For example, several fittings 160 may have greater offsets to accommodate greater tolerances between the respective parts. Alternatively, if the parts have less tolerance, the offset dimension can be smaller.

Figure 2C:
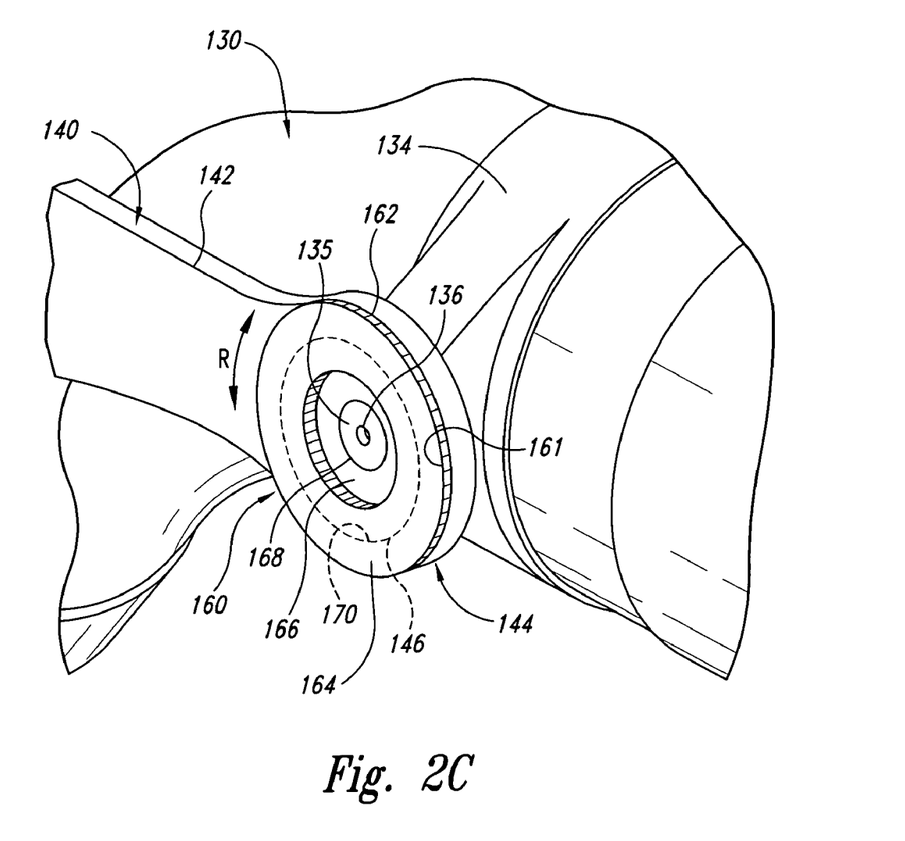

FIG. 2C is an isometric view of the area 2C of FIG. 2A showing one of the adjustable fittings 160 engaged with the support member 140 and the housing 134 to releasably couple the support member to the fluid conduit 130. Although only one adjustable fitting 160 is shown in FIG. 2C, it will be appreciated that each of the adjustable fittings 160 shown in FIG. 2A can be engaged with the corresponding support member 140 and housing 134 in a manner generally similar to that illustrated in FIG. 2C. The engagement portion 170 (shown in broken lines) of the adjustable fitting 160 is received within the first aperture 146 (shown in broken lines) of the first attachment portion 144 of the support member 140 and the second side 162 of the fitting 160 is in contact with at least a portion of the first attachment portion 144 of the support member 140. The fitting aperture 168 receives at least a portion of the first attachment feature 135. In one aspect of this embodiment, the center point B (FIG. 2B) of the fitting 160 is eccentrically offset from a center point of the generally arcuate or circular end portion of the first attachment feature 135.

After the first attachment feature 135 is received within the fitting aperture 168, the adjustable fitting 160 can be rotated in a clockwise and/or counterclockwise direction (as shown by the arrow R) to lock or otherwise secure the fitting 160 in place with respect to the first attachment feature 135. More specifically, during rotation of the adjustable fitting 160, the fitting aperture 168 maintains a generally eccentric orbit about the center point of the end portion of the first attachment feature 135 until a portion of the fitting aperture 168 engages at least a portion of the first attachment feature 135, thus preventing further rotation of the fitting aperture 168 about the center point of the end portion of the first attachment feature 135 and, accordingly, releasably securing the support member 140 to the housing 134. One advantage this feature is that it allows the engagement portion 170 and the fitting aperture 168 of the adjustable fitting 160 to fit within the first aperture 146 and over the first attachment feature 135, respectively, while accounting for manufacturing tolerances in both the relative location of the first attachment feature 135 and expansion/contraction of the various components during fabrication. In several embodiments in which the tolerances between the respective parts are extremely small, the fitting aperture 168 and the center point of the end portion of the first attachment feature 135 can be approximately concentrically aligned after engagement with each other. In other embodiments, however, the fitting aperture 168 and the center point of the end of the first attachment feature 135 are not concentrically aligned after engagement.

Figure 2D:
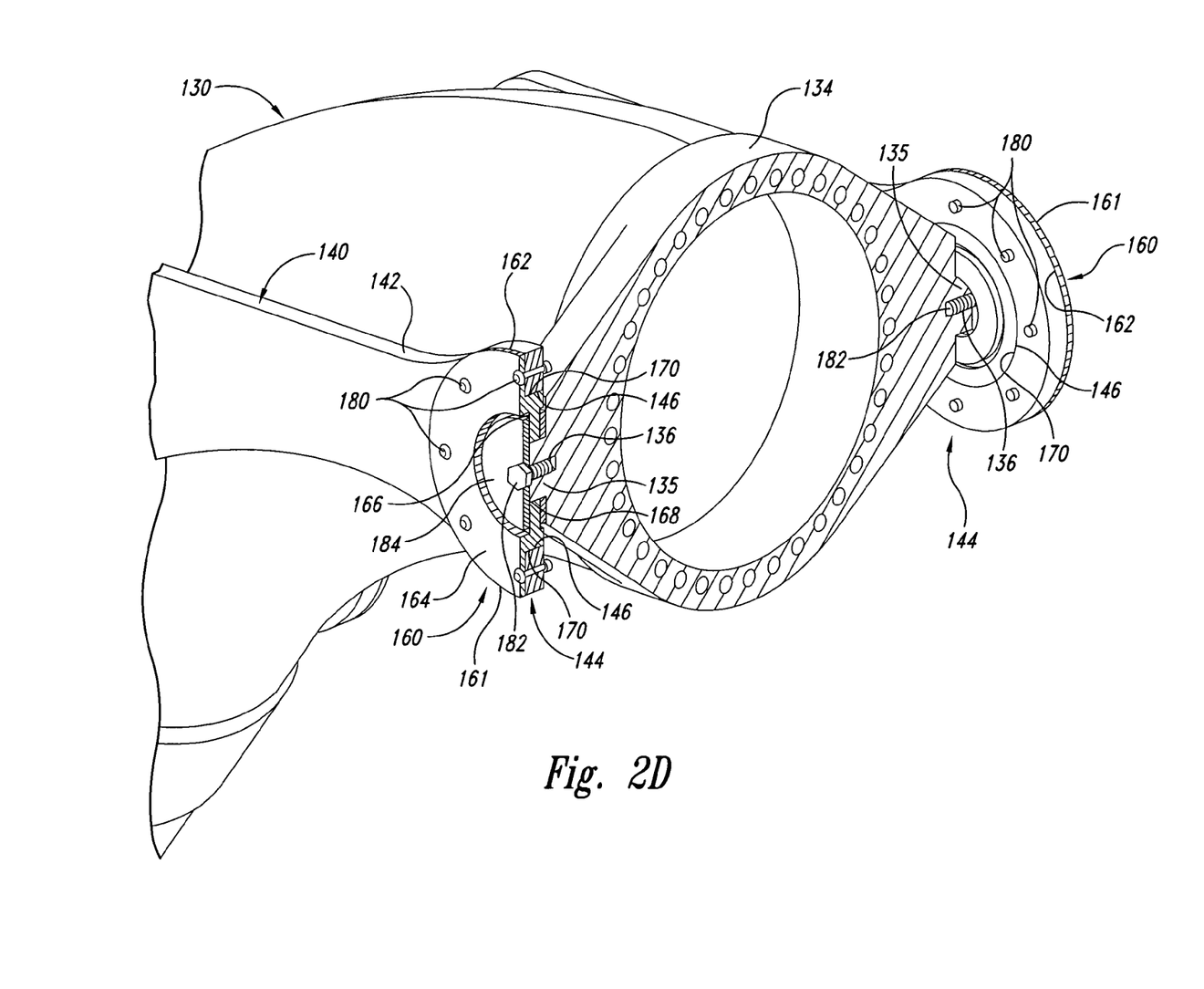

FIG. 2D is an isometric illustration of an end portion of the fluid conduit 130 with a cut-away portion showing further details of the adjustable fittings 160 after the fittings 160 are installed with the support members 140 and corresponding first attachment features 135. In one aspect of this embodiment, the fittings 160 can be fixedly attached to the support members 140 with retaining hardware 180 (e.g., bolts) after the adjustable fittings 160 are rotated and locked in place with respect to the first attachment features 135 as described above with reference to FIG. 2C. The individual fittings 160 can be secured to the housing 134 using a fastener 182 (e.g., a bolt) and, optionally, a retaining member 184 (e.g., a washer). The retaining members 184 can be positioned within at least a portion of the second annular portion 166 of the individual fittings 160 and the fasteners 182 can be engaged with the corresponding threaded apertures 136 of the first attachment features 135 to hold the retaining member 184 in place. In this way, the support members 140 are secured in place with respect to the fluid conduit 130 and the support members 140 can distribute and/or transfer the various loads imposed on the fluid conduit 130. In other embodiments, the adjustable fittings 160 can be fixedly secured to the support members 140 and/or the first attachment features 135 using other arrangements.

One feature of at least some of the embodiments of the adjustable fittings 160 described above is that the eccentrically offset arrangement of the fitting apertures 168 (the second attachment features) with respect to the first attachment features 135 can account for manufacturing tolerances between the various components. An advantage of this feature is that it allows for interchangeability of parts (e.g., support members) and allows a single type of part to be used universally throughout a system. For example, support members 140 having the same configuration could be used at various portions of the fluid conduits 130 of the aircraft 100 (FIG. 1) without having to custom fit and/or manufacture unique support members at each location. Accordingly, this feature can significantly reduce the time and expense of manufacturing and/or retrofitting.

Another feature of at least some of the embodiments of the adjustable fittings 160 described above is that they can be installed and removed with common hand tools. For example, the connections between the fastener 182 and the first attachment features 135 can be threaded connections that can be secured and released with wrenches or other suitable hand tools. An advantage of this feature is that it can reduce the time and cost associated with installation and removal of the support members 140 with respect to the fluid conduits 130.

Figure 3:
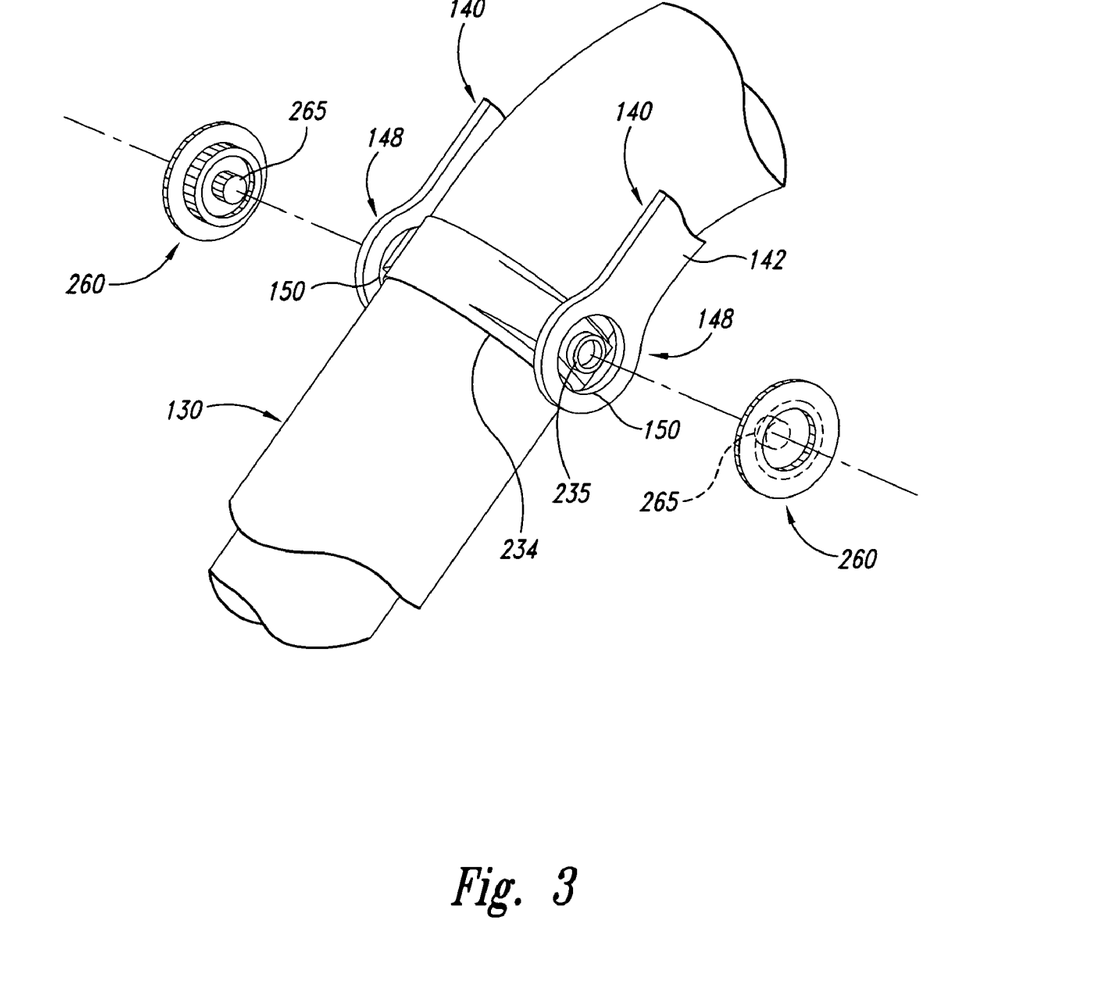
FIG. 3 is an isometric illustration of a stage in a method for using adjustable fittings to couple support members to fluid conduits in accordance with another embodiment of the invention.

FIG. 3 is an isometric illustration of a stage of a method for using adjustable fittings to couple support members to fluid conduits in accordance with another embodiment of the invention. More specifically, FIG. 3 is an isometric view illustrating an adjustable fitting 260 positioned for attachment with the support member 140 and a housing 234 carried by the fluid conduit 130. The adjustable fitting 260 and housing 234 can be generally similar to the fitting 160 and housing 134 described above with reference to FIGS. 2A and 2B. The fitting 260 and housing 234 illustrated in FIG. 3 differ from the fitting 160 and housing 134 described above, however, in that the engagement portions of the respective parts are reversed. For example, the adjustable fitting 260 includes a first attachment feature 265 projecting outwardly from the fitting 260 and the housing 234 includes a second attachment feature 235 (e.g., an aperture) positioned to receive at least a portion of the corresponding first attachment feature 265. After the second attachment feature 235 receives the first attachment feature 265, the fitting 260 can be rotated in a clockwise and/or counterclockwise direction to lock or otherwise secure the fitting 260 in place with respect to the housing 234, as described in greater detail above with reference to FIGS. 2C and 2D. In other embodiments, the first and/or second attachment features can have other configurations.

Figure 4A:
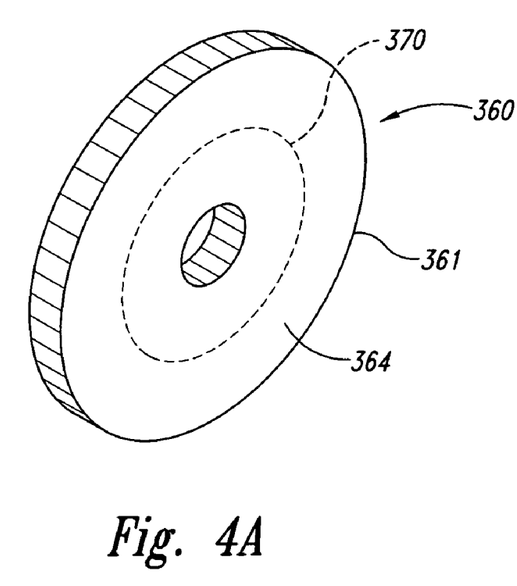
FIGS. 4A and 4B are isometric illustrations of adjustable fittings configured in accordance with additional embodiments of the invention.
Figure 4B:
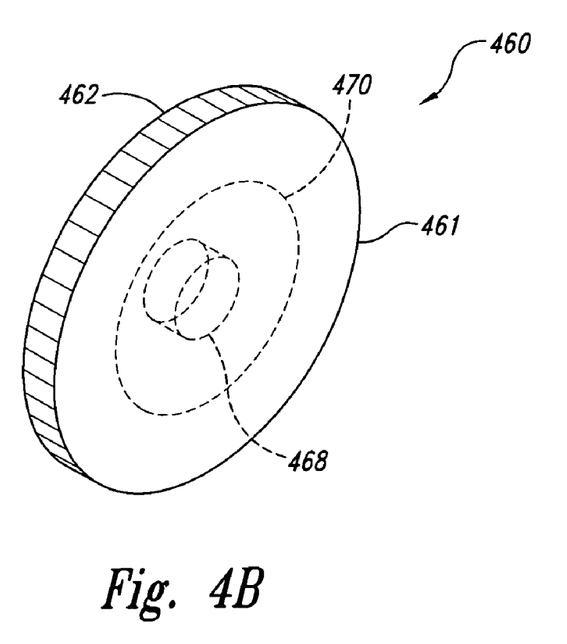

From the foregoing, it will be appreciated that specific embodiments of the invention have been described herein for purposes of illustration, but that various modifications may be made without deviating from the invention. For example, the adjustable fittings may have other configurations. Referring to FIG. 4A, an adjustable fitting 360 configured in accordance with another embodiment of the invention may not include the second annular portion on a first side 361 of the fitting 360 and may instead only include a first annular portion 364. In still another embodiment shown in FIG. 4B, an adjustable fitting 460 may have a fitting aperture 468 that does not extend completely through the fitting 460. For example, the fitting aperture 468 extends from a second side 462 of the fitting 460 to an intermediate depth between a first side 461 and the second side 462 of the fitting 460. Although the fitting aperture 468 does not extend completely through the fitting 460, the fitting aperture 468 is still sized to receive the necessary portion of an attachment feature to secure the fitting in place with respect to the support member and fluid conduit. Aspects of the invention described in the context of particular embodiments may be combined or eliminated in other embodiments. For example, the fluid conduits can be used to transfer liquids other than fuel. Further, aspects of the invention described in the context of the specific systems of the aircraft can be implemented in other systems and/or can be implemented in vehicles or devices other than aircraft. Moreover, the adjustable fittings may be used to couple any type of first member to a corresponding second member, and are not limited to fluid conduits and/or support members. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft system, comprising:
a fluid conduit carried by an aircraft;
a first housing fixedly attached to the fluid conduit, the first housing including a first attachment feature having a projection extending outwardly from the housing;
a second housing fixedly attached to the fluid conduit and spaced apart from the first housing, the second housing including another first attachment feature;
a support member having a first attachment portion positioned proximate to the first housing and a second attachment portion proximate to the second housing, the first attachment portion including a first support member aperture positioned over at least a portion of the first attachment feature and the second attachment portion including a second support member aperture positioned over at least a portion of the other first attachment feature; and
a first adjustable fitting coupling the first attachment portion of the support member to the first housing, and a second adjustable fitting coupling the second attachment portion of the support member to the second housing, each adjustable fitting including
a first side;
a second side opposite the first side, the second side including an engagement portion positioned within at least a portion of the corresponding support member aperture; and
a second attachment feature mated with the corresponding first attachment feature, the second attachment feature having an aperture, and wherein the second attachment feature has a center point eccentrically offset from a center point of the adjustable fitting.

2. The system of claim 1 wherein each adjustable fitting is rotatable with respect to the respective first attachment feature to secure the adjustable fitting in place against the support member and the respective housing.

3. The system of claim 2 wherein:
the projection of each first attachment feature includes a generally arcuate end portion with a first center point defined at least in part by the end portion; and
the aperture of each second attachment feature includes a second center point, and wherein the second center point is at least partially eccentrically offset from the first center point when each adjustable fitting is secured in place against the respective housing.

4. The system of claim 1 wherein:
the first and second attachment portions of the support member have a first diameter; and
each adjustable fitting includes a generally annular fitting having an outer diameter generally corresponding to the first diameter of the attachment portions.

5. The system of claim 1, further comprising:
one or more first fasteners releasably coupling the adjustable fittings to the respective attachment portions of the support member; and
a second fastener extending through the aperture and releasably coupling the adjustable fittings to the respective attachment features.

6. The system of claim 1 wherein the fining aperture extends completely through each adjustable fitting from the second side to the first side.

7. The system of claim 1 wherein the fitting aperture extends partially through each adjustable fitting from the second side to an intermediate depth between the first side and the second side.

8. The system of claim 1 wherein the first side of each adjustable fitting comprises a first annular portion having a first dimension and a second annular portion having a second dimension less than the first dimension.

9. The system of claim 1 wherein the first adjustable fitting has a first eccentric orientation relative to the first attachment feature, and the second adjustable fitting has a second eccentric orientation different than the first orientation relative to the other one of the first attachment features.

10. The system of claim 1 wherein the support member is configured to receive imposed surge loads and pressure loads from the fluid conduit.

11. The system of claim 1 wherein each adjustable fitting is configured to be installed with and uninstalled from the respective housing and the support member using common hand tools.

12. The system of claim 1 wherein the aircraft comprises:
a fuselage portion;
a wing portion; and
a fuel tank carried by at least one of the fuselage portion and the wing portion, and wherein the fluid conduit is operably coupled to the fuel tank.

13. The system of claim 12, further comprising:
a plurality of fluid conduits operably coupled to the fuel tank;
a plurality of housings fixedly attached to corresponding fluid conduits, the individual housings including first attachment features;
a plurality of support members positioned proximate to corresponding housings, the individual support members including attachment portions having support member apertures positioned over at least a portion of corresponding first attachment features, and wherein the individual support members are generally identical; and
a plurality of adjustable fittings coupling the attachment portions of the support members to corresponding first attachment features on each housing, wherein two or more adjustable fittings have different eccentric orientations relative to the corresponding first attachment features.

* * * * *

UNITED STATES PATENT AND TRADEMARK OFFICE
CERTIFICATE OF CORRECTION

| | |
|---|---|
| PATENT NO. | : 7,581,700 B2 |
| APPLICATION NO. | : 11/440726 |
| DATED | : September 1, 2009 |
| INVENTOR(S) | : James A. Carns et al. |

It is certified that error appears in the above-identified patent and that said Letters Patent is hereby corrected as shown below:

On page 2, in column 2, under "Other Publications", line 6-7, delete "MotorpPresse" and insert -- MotorPresse --, therefor.

In column 8, line 16, in claim 6, delete "fining" and insert -- fitting --, therefor.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO.      : 7,581,700 B2
APPLICATION NO. : 11/440726
DATED           : September 1, 2009
INVENTOR(S)     : Carns et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Fourteenth Day of September, 2010

David J. Kappos
*Director of the United States Patent and Trademark Office*